United States Patent
Tigert

(10) Patent No.: US 7,306,331 B1
(45) Date of Patent: Dec. 11, 2007

(54) VISION PROTECTION DEVICE FOR NIGHT DRIVING

(76) Inventor: Alan Tigert, 14820 Elmore Rd., Anchorage, AK (US) 99516

( * ) Notice: Subject to any disclaimer, the term of this patent is extended or adjusted under 35 U.S.C. 154(b) by 0 days.

(21) Appl. No.: 11/244,922

(22) Filed: Oct. 6, 2005

(51) Int. Cl.
*G02C 7/16* (2006.01)
(52) U.S. Cl. .......................................... 351/45; 351/41
(58) Field of Classification Search ................ 351/41, 351/44–46
See application file for complete search history.

(56) References Cited

U.S. PATENT DOCUMENTS

| | | | | |
|---|---|---|---|---|
| 2,699,093 A | * | 1/1955 | Auwarter | 351/45 |
| 3,199,114 A | * | 8/1965 | Malifaud | 351/45 |
| 4,828,380 A | * | 5/1989 | Cherian | 351/45 |
| 2003/0147047 A1 | * | 8/2003 | Renard | 351/163 |

\* cited by examiner

*Primary Examiner*—Huy Mai
(74) *Attorney, Agent, or Firm*—Michael J. Tavella

(57) ABSTRACT

A vision enhancement and protection device for night time driving of automobiles where the driver is subjected to the high intensity light of the headlights of oncoming vehicles and the reflected light from the rear view mirror of the headlights of automobiles following the driver's automobile. The device is a light attenuation device applied to normal eyeglass lenses, or a separate set of lenses which may be clipped on to a set of normal eyeglasses, in a particular location and orientation relative to the location of the driver's pupils behind the eyeglasses.

8 Claims, 4 Drawing Sheets

VISION PROTECTION DEVICE FOR NIGHT DRIVING

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

The present invention relates to a light attenuation device applied to regular eyeglasses or clip on eyeglass lenses used as a vision aid during night driving.

2. Description of the Prior Art

Driving automobiles at night is a much more difficult task than during daylight due to the limited illumination provided by the headlights of the automobile. Visual detection of objects becomes more difficult as the distance from the automobile increases due to the lowering intensity of the reflected light from the object as the distance from the headlight increases. Vision is further inhibited when oncoming automobile headlights or light from following automobiles shines into the eyes of the driver, causing a reduction in pupil size and resultant loss of sensitivity of vision. The ability of the driver to detect objects in the path of his travel diminishes greatly as the intensity of the light from the oncoming or following automobile's headlight increases. Furthermore, the ability to regain full vision after an oncoming automobile passes is delayed as the pupil expands back open to regain full sensitivity to the comparatively weak reflected light from the headlights. As the age of the driver increases, the sensitivity of the eyes to weak light diminishes, and the recovery period as the pupil opens back up after an oncoming automobile has passed increases also, making night time driving for middle aged and older drivers even more difficult.

At present there are few night driving glasses on the market and they use tinting of the eyeglass lenses over the full surface of the lens, or in a band, which travels the full width of the eyeglass lens. While these lens configurations can reduce the intensity of the light received by the driver's eyes, they also reduce the intensity of the light reflected back to the driver from the objects illuminated by the driver's automobile headlights for much of the visual field outside the area of the oncoming headlights. Thus, little or no net gain in vision is obtained during the period in which the driver is subjected to oncoming or following automobile lights. Moreover, many standard eyeglasses incorporate antireflection coatings, which do reduce glare and help retain visual contrast in the presence of high intensity light. These eyeglasses may be used in conjunction with application of the described light attenuation device to provide added benefits of glare reduction through antireflection coatings.

BRIEF DESCRIPTION OF THE INVENTION

The instant invention is a device primarily adapted for use in the nighttime driving of automobiles wherein the driver is subjected to the high intensity light coming directly from the headlights of oncoming automobiles, or the light reflected by the left hand rearview mirror of following vehicles. The visual protection device is a pair of cone shaped light attenuating filters (cslafs), which can be attached or applied to a pair of regular eyeglass lenses or clip on lenses for eyeglasses. The filters reduce the intensity of light from these oncoming light sources while minimizing the loss of visual sensitivity throughout the remainder of the driver's field of vision.

The cslafs have a rounded tip and angular members that extend sideways from the rounded tip. The cslafs can have angular structure ranging from 90 degrees to a flat (zero degree) oval. Although the cslafs can range from 90 to 0 degrees, in the preferred structure, the cslafs are placed on the outer surface of the lenses with the center of the radius of the rounded tip positioned above the center of the pupil of each eye so that the vision field is not occluded below an upward angle of approximately 20 degrees. The upper edge of the cslaf is oriented horizontally extending to the left side (looking out through the lens) of the lens. Lowering the angle of the head by 20 degrees lowers the filter so that its right radius centers over the pupil and covers the field of vision laterally to the left (in the US and other countries in which vehicles are driven on the right side of the road) to the edge of the glasses lens. Oncoming vehicle headlights are attenuated by the filter as they approach and pass to the left side of the driver. This strip of the field of vision is attenuated by the filter while the head is tilted down, while the entire field of vision to the right of center, and the area above and below the filter remains clear. After the oncoming vehicle(s) have passed, the head is tilted back to the normal position, which raises the filter out of the field of vision encompassing the view out of the windshield. In this manner, the oncoming light sources are attenuated to the maximum possible degree with minimal occlusion of the wearer's field of vision outside of the visual path of the oncoming lights. Moreover, when they are not being used, the cslafs are moved entirely out of the driver's field of vision.

The angle of the cslaf pointing out to the outer edge of the vision field of a pair of ordinary glasses lenses may be varied depending upon the type of conditions encountered by the driver, and his vertical position relative to the oncoming lights. For example, the driver of an ordinary sedan would have the top edge of the filter positioned level to 10 degrees upward towards the left side of the lenses to track the path of the oncoming light sources properly. On the other hand, the operator of a large semi tractor trailer rig is better served by angling the top edge of the filter down at an angle of 5-15 degrees to match the light source paths as they pass below and to the left.

It is accordingly an object of the present invention to provide a visual protection device, which provides for a large reduction of the headlight intensity of oncoming and following automobiles.

It is another object of the invention to provide a visual protection device, which minimizes the reduction of the sensitivity of the driver's vision throughout that portion of the driver's visual field, which is not directly in line with the oncoming or following lights.

DETAILED DESCRIPTION OF THE INVENTION

There are four parameters that define the invention: shape and size; transmittance characteristics; the position on the lenses relative to the eyes; and the materials used for the invention.

Figure 1:
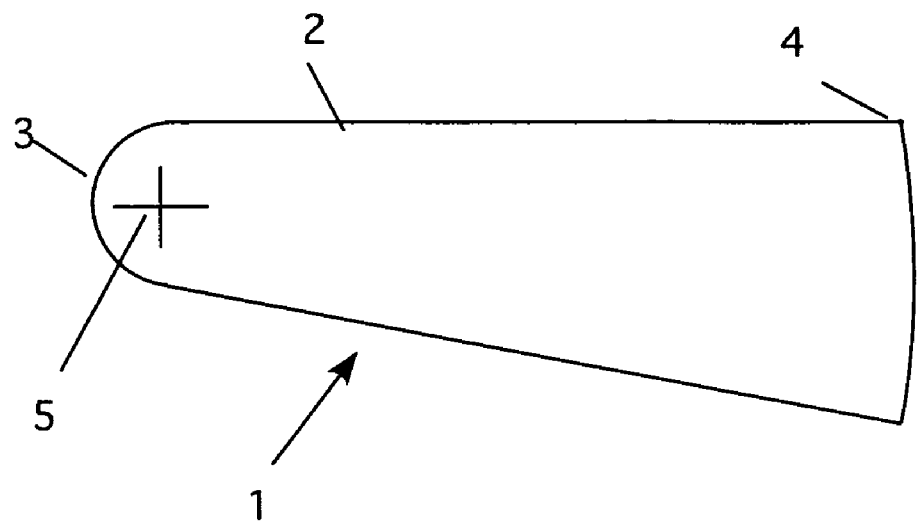
FIG. 1 is front elevation view of the preferred embodiment of the invention.
Figure 2:
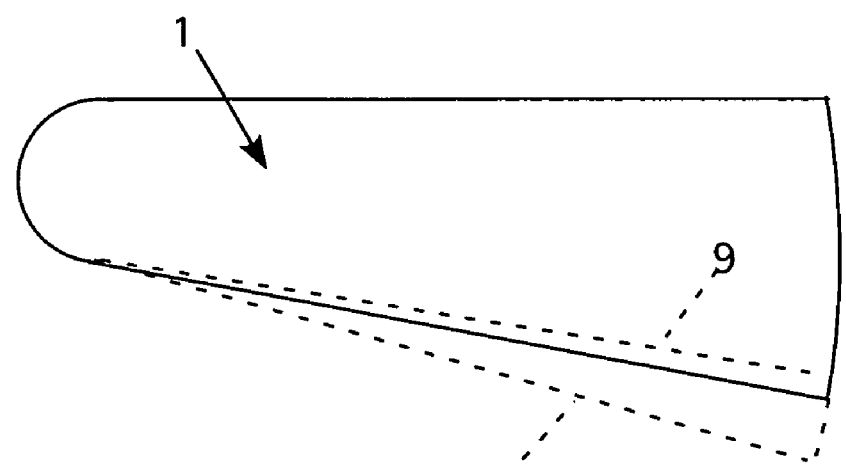
FIG. 2 is a front elevation view of the invention showing the preferred range of widths of the end of the device.

Referring to FIGS. 1 and 2, the vision protection device 1 is cone shaped, with the small end of the cone 2 ending in a circular tip 3 with a radius between 2 and 6 millimeters, the preferred embodiment being 2.5 mm radius at the tip for normal driving conditions. The length of the cone before application is 50 millimeters with the large end 4 having a width between 9 and 20 millimeters (producing an angle of between about 16 degrees), varying according to the type of traffic most commonly encountered and the curve of the lens edge. For example, the light from multilane oncoming traffic is best attenuated with the wider cone, while the thinner cone profile allows retention of the maximum possible unattenuated field of view and is best suited for dealing with single lane oncoming traffic.

Figure 3:
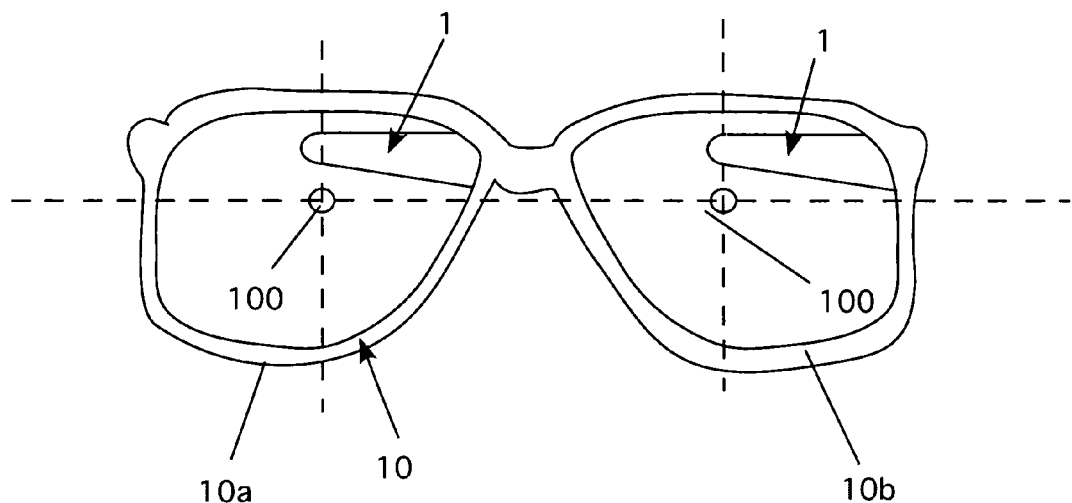
FIG. 3 is a front view of a typical pair of eyeglasses showing the invention in place.

FIG. 3 shows the device installed on a pair of glasses 10, having a pair of lenses 10a and 10b. The applied length of the cone is determined by the position of the device on the eyeglass lens. In the preferred embodiment, the device is positioned so that the center of the cone tip radius 5 is directly above the center of the iris 100 of the wear's eye. The cone is then trimmed to match the outer edge of the lens as shown.

Transmittance

The transmittance characteristics of the vision protection devices can range from 5% to 35%, with a preferred embodiment for most driving conditions of 20% transmittance. This produces a five times increase in visual acuity for the area outside the attenuated area of vision. Various tints and band pass filters can be used, from an amber to blue tint, with the preferred embodiment being a 20% transmittance, neutral grey filter polarized 45 degrees clockwise from vertical, from the user's perspective.

Materials

The requirements for the material used to construct the vision protection device include a polarized, neutral tint transmission ratio of 5 to 25% coating, with reasonable durability in the form of the ability to resist abrasion and scratching, and the ability to be easily applied to the plastic or glass eyeglass lens temporarily or permanently.

Mylar and other plastic films with neutral tint transmission percentage in the range defined are suitable for use in construction of the device. The preferred embodiment of the vision protective device deposits a thin polarized film of the proper placement and shape on the lens, with the thickness of the coating controlled to provide the desired transmission percentage. The lens may then be covered with an additional protective coating or antireflective coating.

Additionally, the CSLAF filter material may also be an 'active' material, which is transparent normally, but goes to its absorptive state upon application of a signal from a set of sensors mounted on the glasses' frames. One sensor detects diffused general light levels. Ambient light levels detected by the diffuse light sensor greater than that experienced in night time driving would disable a second sensor, which would be a directional sensor facing forward with a 45 degree lateral field of sensitivity and a 30 degree vertical field of sensitivity facing forward from the face of the glasses. This second sensor activates the CSLAF to go to its attenuating state of approximately 80% absorption. There are currently several liquid crystal type coatings that would accomplish this operation of the CSLAF.

Positioning of the Device

The center of the radius of the curve of the small end of the device is placed vertically "x" millimeters above the center of the iris of each eye. In the preferred embodiment, the center of the radius of the smaller end of the light attenuation device is placed 25 degrees above the horizontal plane of the field of vision with the head in its normal upright position.

Figure 4:
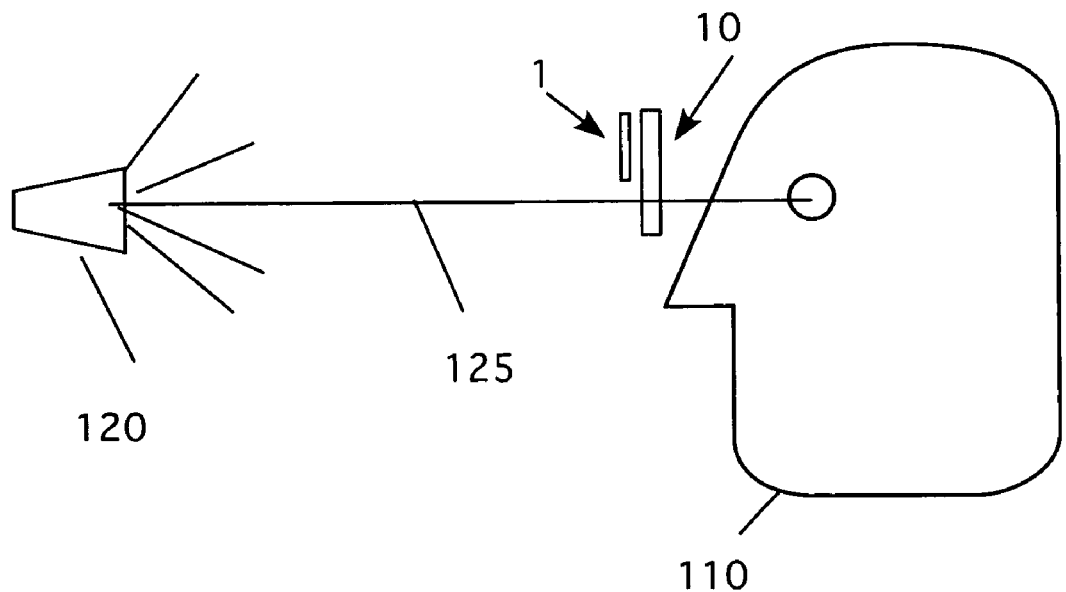
FIG. 4 is a schematic view of a user with the invention in place, showing a non-operating device position.

FIG. 4 is a schematic view of a user with the invention in place, showing a non-operating device position. In this view, the user 110 is shown looking straight ahead. The glasses 10 and the device 1 are shown in an exaggerated position for clarity. A light 120 is shining in the direction of the user as indicated by the line 125.

Figure 5:
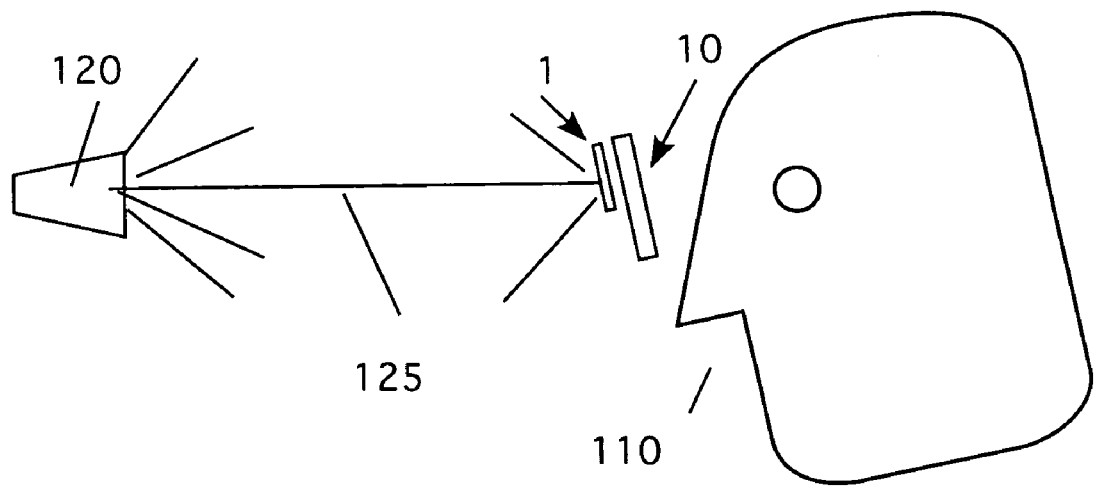
FIG. 5 is a schematic view of a user with the invention in place, showing an operating device position.

FIG. 5 is a schematic view of a user with the invention in place, showing an operating device position. Tilting the head down by 25% brings the center of radius of the small end of the vision protection device into position centered vertically in the horizontal plane of vision of the user's eyes. At the same time, the body of the vision protection device is positioned starting at the center of the field of vision (in countries where vehicles drive on the right side of the road) and extends out to the left edge of the eyeglass lens. Thus, it covers the field of vision impacted by the lights of oncoming vehicles as they pass the user on the left. As shown in FIG. 5, the user 110 has tilted his head forward. Now, the device 1 is in line with the light beam 125. As shown in the diagram, the light 125 is "deflected" from the user's eyes.

Figure 6:
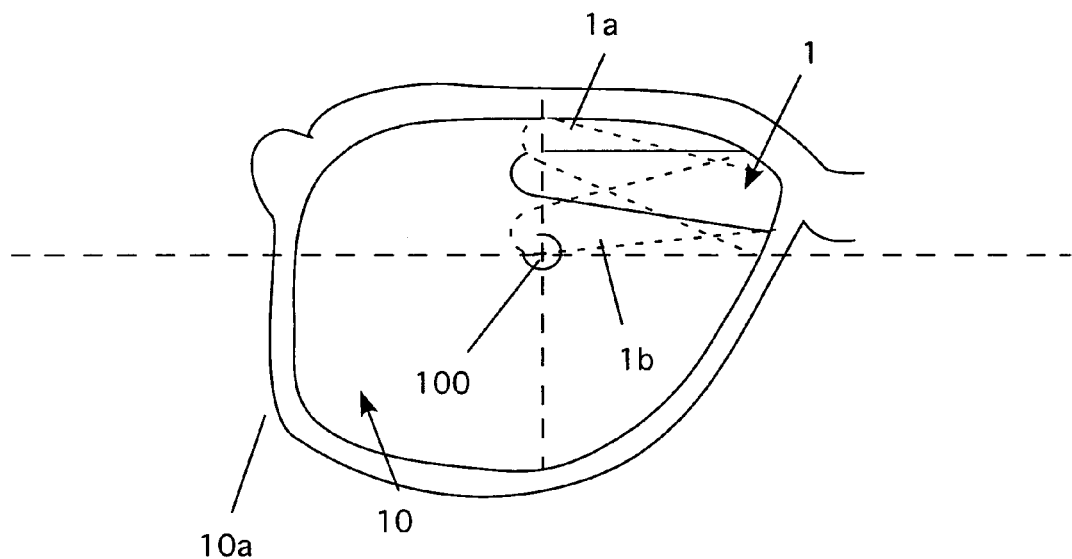
FIG. 6 is a detail of one lens showing a range of angular placement for the preferred embodiment of the device.

The upper edge of the vision protection device is set at an angle ranging from 15 degrees up to 15 degrees down going to the left edge of the eyeglass lens. This is shown in FIG. 6. This angle varies according to the height of the driver in the vehicle being driven. For example, for use in normal automobiles, the angle ranges between about 0 degrees (horizontal) to 10 degrees upward, which would place the vision protection device in position to attenuate the majority of oncoming vehicles passing the driver on the left. For drivers of vehicles with a higher seating position, such as commercial trucks and tractor-trailer vehicles, the upper edge leading to the outside edge of the eyeglass lens would be angled down between about 5 to 10 degrees so that the protection device would effectively cover the headlights of oncoming vehicles for the user in the higher driving position.

This position of the vision protection device on the eyeglass lens provides the maximum attenuation of oncoming light as it moves through the user's field of vision while minimizing the attenuation of the remainder of the vision field, providing maximum increase in useful vision for the user.

The filter is normally positioned above the area of the eyeglass providing the normal field of vision, so that the active action of tilting the driver's head downward approximately 20 degrees is necessary to bring the CSLAF into the field of vision.

A return of the head back to the normal viewing position moves the filter back up and out of the driver's vision field.

Alternatives

Figure 7:
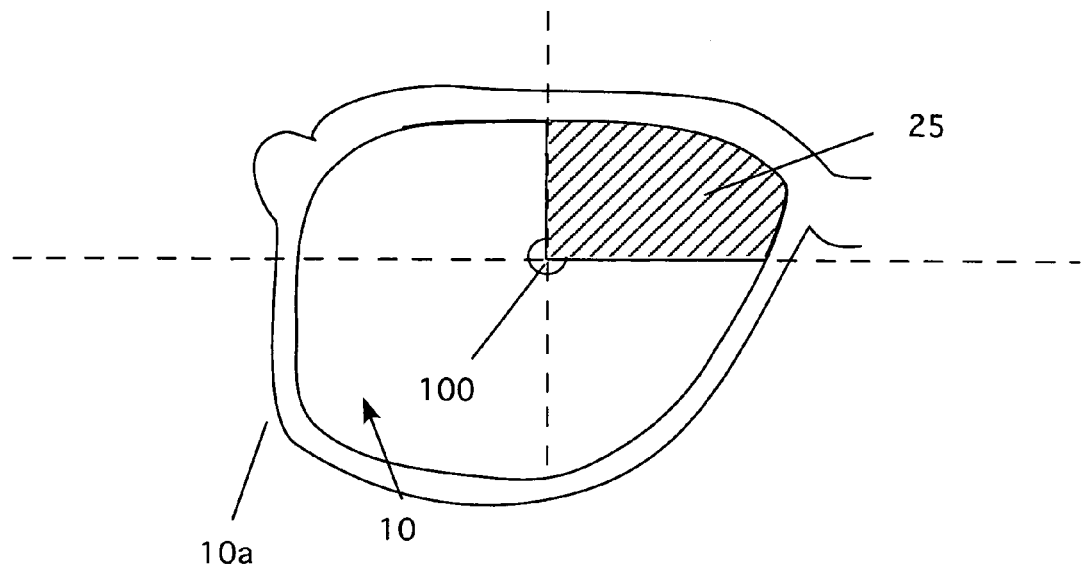
FIG. 7 is a front elevation view of a second embodiment of the device.
Figure 8:
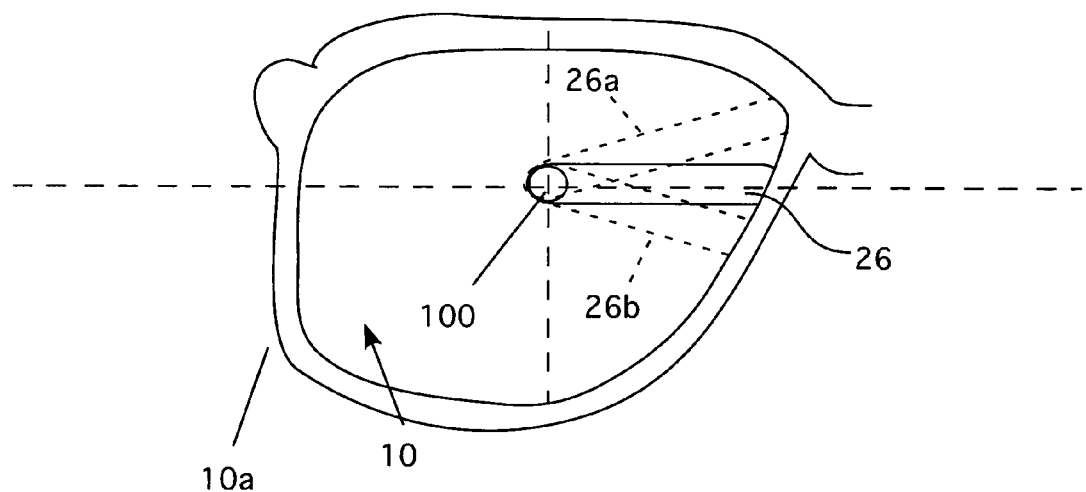
FIG. 8 is a front elevation view of a third embodiment of the device.

FIG. 7 is a front elevation view of a second embodiment of the device. Here, it is noted that the cone 20 can have an upper limit angle of 90 degrees, as shown. This is not preferred, however as it may restrict vision too much during driving. Alternatively, the cone can have an ovular shape 25 as shown in FIG. 8. In this embodiment, the angle is effectively zero degrees. As in the embodiments above, this embodiment may be rotated to best fit the driving conditions. Note that this embodiment is also not preferred because of the linear nature of the shape. The angles cone shape of the preferred embodiment places the most blocking nearer to the edges of the lens, where it is needed most. In the case of the oval, the oval has two radii, one at each end. Like the cone shaped device of the first embodiment, the radius of the end near the center of the lens can vary from about 2 and 5 millimeters an has a preferred radius of 3.5 mm.

Note also that the large angled cones are best suited for use in multilane oncoming traffic conditions, while the smaller interior angle and resulting thinner cone profile is more suited for single lane oncoming traffic conditions as it allows retention of the maximum possible unattenuated field of view.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A vision protection device for night driving comprising a cone shaped, member having a first end and a second end, wherein the first end of the cone shaped member having a radius with a center, and a second end of said cone shaped member having a width substantially larger than the radius of said first end and further wherein said cone shaped member being attached to a lens on a pair of eyeglasses; said cone shaped member being positioned on said lens such that the center of the cone tip radius is directly above a user's iris such that when the head of said user is in an upright position the cone shaped member is out of the user's field of vision and further such that when the user's head is in a forwardly lowered position said cone shaped member is in the user's field of vision.

2. The vision protection device for night driving of claim 1 wherein the radius of the first end is between about 2 and 5 millimeters.

3. The vision protection device for night driving of claim 1 wherein the radius of the first end is about 3.5 mm.

4. The vision protection device for night driving of claim 1 wherein the cone shaped member has a length and further wherein the length of the cone is about 50 millimeters.

5. The vision protection device for night driving of claim 1 wherein the width of the second end is between about 9 and 20 millimeters.

6. The vision protection device for night driving of claim 1 wherein the cone shaped member has an interior angle.

7. The vision protection device for night driving of claim 6 wherein the interior angle is between about zero degrees and 90 degrees.

8. The vision protection device for night driving of claim 6 wherein the interior angle is between about 10 to 16 degrees.

\* \* \* \* \*